Dec. 13, 1938.  S. B. SCHRADER  2,139,976
TURN INDICATOR
Filed June 9, 1937  2 Sheets-Sheet 1
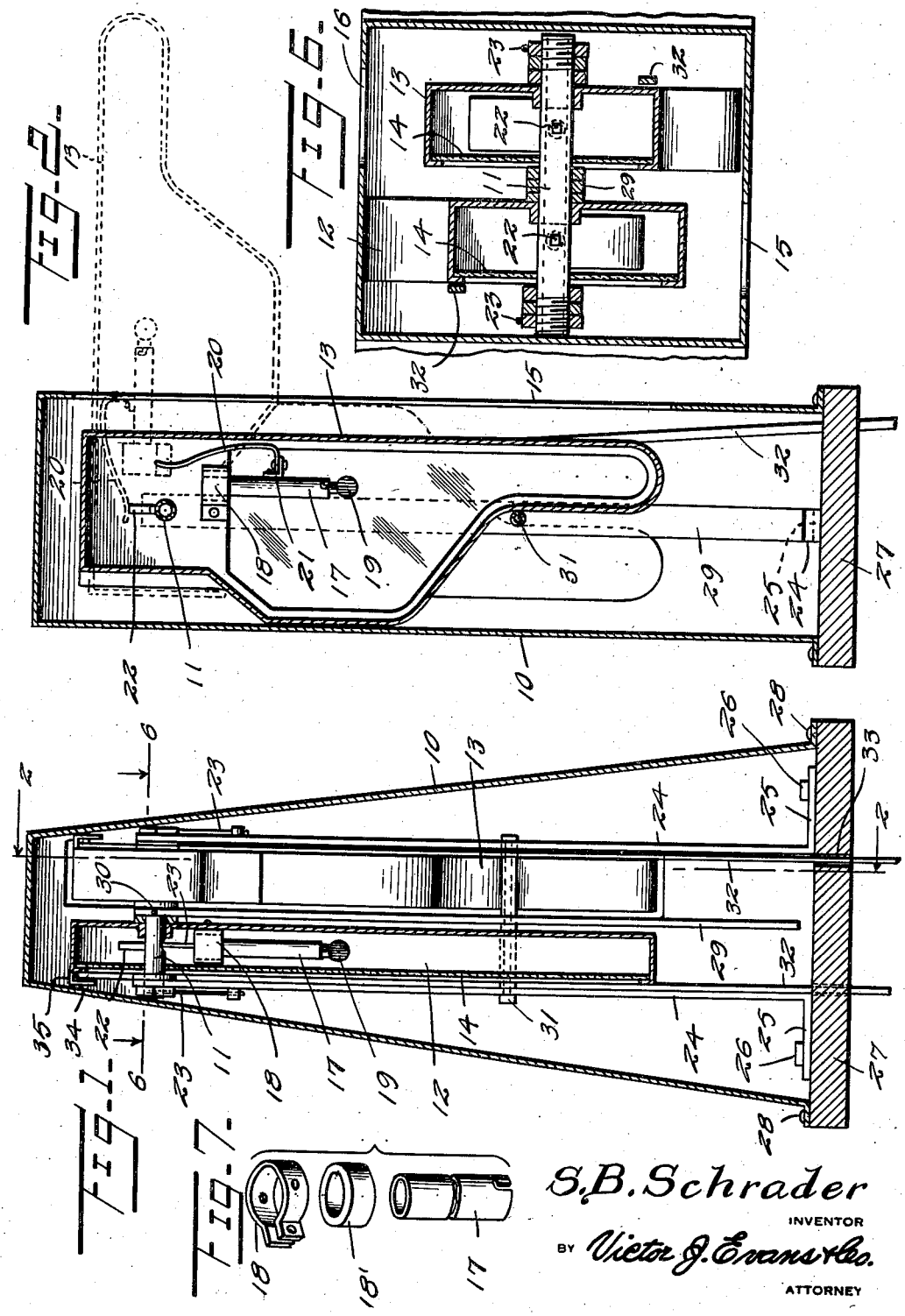
S. B. Schrader
INVENTOR
BY Victor J. Evans & Co.
ATTORNEY Dec. 13, 1938.    S. B. SCHRADER    2,139,976
TURN INDICATOR
Filed June 9, 1937    2 Sheets-Sheet 2
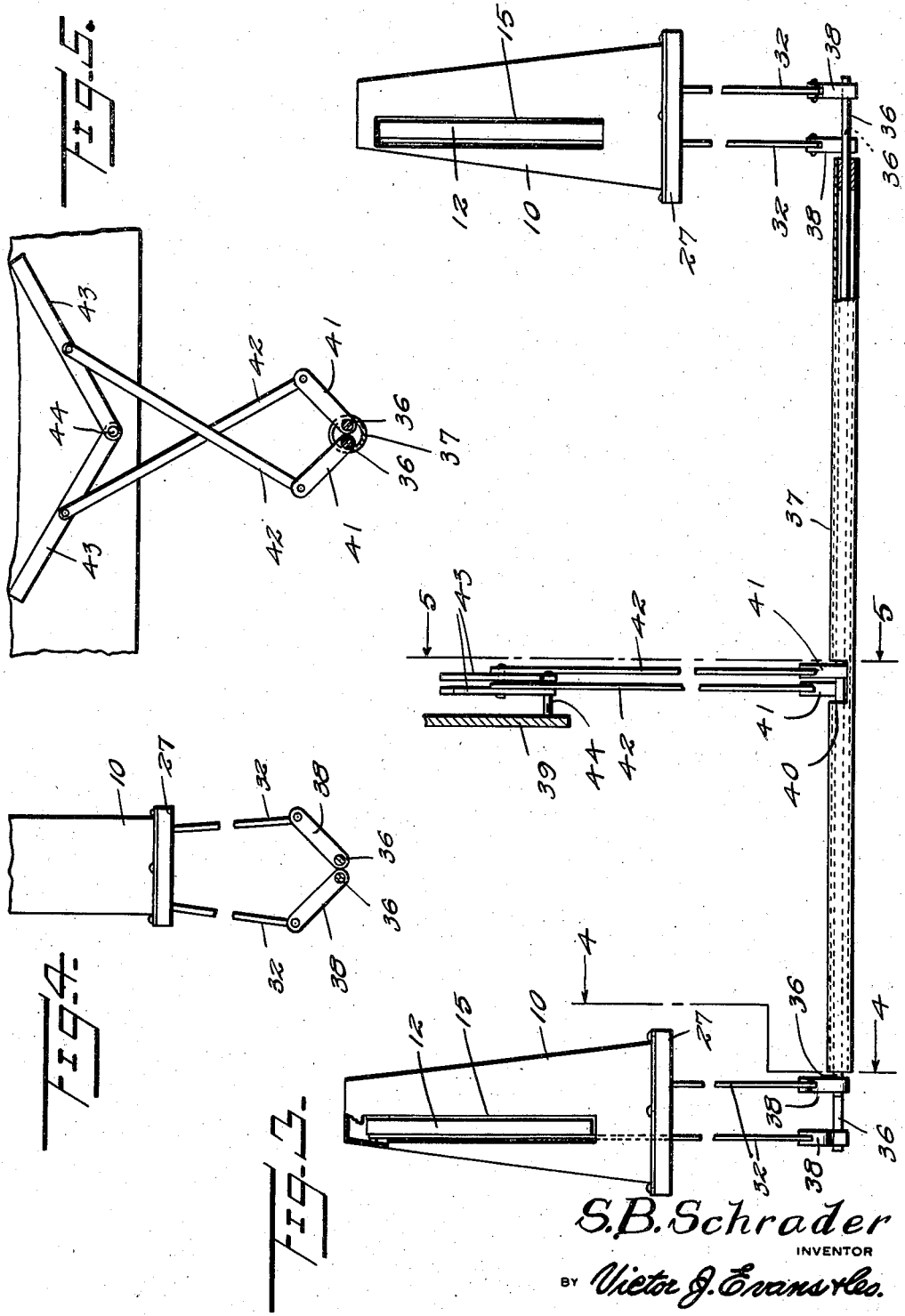
S. B. Schrader
INVENTOR
BY Victor J. Evans & Co.
ATTORNEY Patented Dec. 13, 1938

2,139,976

UNITED STATES PATENT OFFICE 2,139,976

TURN INDICATOR

Samuel B. Schrader, Clyde, N. Dak.

Application June 9, 1937, Serial No. 147,339

1 Claim. (Cl. 116—53)

This invention relates to turn indicators and has for an object to provide novel apparatus for projecting a pointer shaped to simulate a hand, and at the same time illuminating the hand, to attract attention of approaching and following drivers and indicate an intended right or left turn.

A further object is to provide novel switch mechanism for closing the light circuit of the hand when the hand is raised into signalling position.

A further object is to provide a signal device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawings forming part of this specification,

Figure 1 is a longitudinal sectional view of a turn indicator constructed in accordance with the invention.

Figure 2 is a longitudinal sectional view of the turn indicator taken on the line 2—2 of Figure 1.

Figure 3 is a side elevation showing the front and rear signal standards and the connections for operating the signal hands from the instrument board of the vehicle, the instrument board being shown in section.

Figure 4 is a detail cross sectional view taken on the line 4—4 of Figure 3, and showing the shafts, crank arms, and rods for operating the right and left signal hands in each standard.

Figure 5 is a detail cross sectional view taken on the line 5—5 of Figure 3, showing the manually controlled levers and other mechanism for rocking the shafts which extend longitudinally of the vehicle and operate the signal hands of the front and rear signal standards.

Figure 6 is a cross sectional view taken on the line 6—6 of Figure 1 showing the manner of mounting the signal hands in the signal standards.

Figure 7 is an exploded perspective view of the signal lamp socket and clamp.

Referring now to the drawings in which like characters of reference designate similar parts in the various views, the turn indicator is shown to comprise a standard 10 at each end of the vehicle. The standard is in the nature of a casing preferably of frusto-pyramid shape, although not necessarily so, and may be supported upon any desired part of the vehicle so as to be within unobstructed view. An axle is supported in the standard at the upper end thereof for pivotally mounting a pair of pointers 12 and 13 which are preferably in the form of casings shaped to simulate a pointing hand at best shown in Figure 2. One wall 14 of each hand is transparent and faces the traffic.

The hands in each standard are loose on the supporting axle 11 and are disposed so that one may be swung upwardly to signalling position through a slot 15 in the right side wall of the standard, as best shown by dotted lines in Figure 2, and the other may be swung upward to signalling position through a slot 16 in the left side wall of the standard, as best shown in Figure 6. Each hand is illuminated when raised to signalling position and for this purpose a lamp socket 17 is secured to the opaque wall of the hand by a clamp 18 and is insulated from the clamp with rubber tubing 18'. The lamp socket is elongated to dispose the lamp bulb 19 at about the center of the hand. The lamp socket 17 carries a spring switch contact 20 which may be secured to the lamp socket by an angle bracket 21, as best shown in Figure 2. The contact extends upwardly toward the shaft 11 and when the hand is raised to signalling position the free end of the contact engages a stationary grounded switch contact 22 in the nature of a pin rising from the axle 11 as best shown in Figures 2 and 6, to close the lamp circuit. Preferably, the lamp bulb is colored red to attract the attention of drivers. The axle 11 is tubular so that the circuit wire 23 for the bulb, best shown in Figure 1, can be directed into the hand. The ends of the axle are supported by bracket arms 24 having feet 25 which are bolted as shown at 26 to a base plate 27 to which the standard is also bolted as shown at 28. Between the brackets a bar 29 is secured at the upper end to the axle as shown at 30, this bar separating the two hands and also carrying a transversely disposed stop pin 31 against which the hands bear when in non-signalling position concealed within the standard.

As above stated the hands are loose on the axle 11 and for rocking each hand a link 32 enters the standard through an opening 33 in the base plate 27 and at the upper end is pivotally connected to an upper rear corner of the hand above the axle 11, by means of a pivot pin 34 passed through the link and through an angle bracket 35 carried by the hand. When the link is pulled downwardly the hand will be rocked on the axle outwardly to project horizontally from the standard and when the link is moved upwardly the hand will be returned to vertical position within the standard.

The operating mechanism for the hands is best shown in Figures 3, 4 and 5 and includes a pair of shafts 36 which are concealed in a tubular housing 37 which extends longitudinally of the vehicle from front to rear. One of these shafts controls the left turn indicating hands of both standards and the other shaft controls the right turn indicating hands of both standards, and for this purpose each shaft is equipped at the ends with crank arms 38 which are connected to the respective left and right hand controlling links 32 above described.

Underneath the instrument board 39 the housing 37 is provided with an opening 40 through which crank arms 41 project, one crank arm being connected to a respective one of the shafts 36 for turning the shaft axially to pull down the associated hand controlling link and lift the hand to signalling position. To these crank arms 41 links 42 are connected, these links preferably crossing each other at some point below the instrument board and at the upper ends being pivotally connected to respective operating levers 43 which are pivoted at the lower ends upon a common pivot 44 disposed on the instrument board, as best shown in Figure 5.

In operation when an intended turn is to be made the driver pushes down the lever 43 which is associated with the signalling hand indicating the contemplated right or left turn. Movement of the lever is transmitted through the respective link 42 to the respective crank arm 41 which turns the respective shaft 36 to pull down the respective link 32 of the standard and lift the selected hand to signalling position exteriorly of the standard.

It will be pointed out that two signalling hands appear, one from the standard on the front of the vehicle to warn approaching drivers and one from the standard on the rear of the vehicle to warn following drivers of the intended right or left turns. Simultaneously with the appearance of the hand in signalling position the switch contact 20 carried by the hand will engage the stationary switch contact 22 and close the signal lamp circuit to energize the bulb 19 whereby the hand is illuminated to attract attention in traffic.

From the above description it is thought that the construction and operation of the invention will be fully understood without further explanation.

What is claimed is:

A turn indicator for vehicles comprising a hollow standard adapted to be supported upon a vehicle, upright bracket arms disposed oppositely to each other in the standard, an axle supported by the upper ends of the bracket arms, a pair of pointers pivotally mounted at the upper ends on said axle, the pointers being in the form of transparencies each shaped to simulate a pointing hand, there being vertically disposed slots in opposite sides of the standards through which the pointers may be selectively swung to exposed signaling position to indicate an intended turn, a bar fixed at the upper end to the axle and extending downwardly between the pointers, and a stop pin disposed transversely of the bar and against which the pointers bear when in non-signaling position concealed within the standard.

SAMUEL B. SCHRADER.